US012797859B2

(12) United States Patent
Rögels et al.

(10) Patent No.: US 12,797,859 B2
(45) Date of Patent: Nov. 17, 2026

(54) WEAR PLATES FOR AGITATOR MILLS

(71) Applicant: Omya International AG, Oftringen (CH)

(72) Inventors: Christoph Rögels, Lörrach (DE); Luis Pedroso, Antanhol (PT)

(73) Assignee: Omya International AG, Oftringen (CH)

( * ) Notice: Subject to any disclaimer, the term of this patent is extended or adjusted under 35 U.S.C. 154(b) by 301 days.

(21) Appl. No.: 18/560,255

(22) PCT Filed: May 5, 2022

(86) PCT No.: PCT/EP2022/062132
§ 371 (c)(1),
(2) Date: Nov. 10, 2023

(87) PCT Pub. No.: WO2022/238227
PCT Pub. Date: Nov. 17, 2022

(65) Prior Publication Data

US 2024/0238795 A1 Jul. 18, 2024

(30) Foreign Application Priority Data

May 11, 2021 (EP) .................................... 21173364

(51) Int. Cl.
*B02C 17/16* (2006.01)
*B02C 17/18* (2006.01)

(52) U.S. Cl.
CPC ........ *B02C 17/163* (2013.01); *B02C 2210/01* (2013.01)

(58) Field of Classification Search
CPC ... B02C 17/163; B02C 17/18; B02C 2210/01; B02C 2210/02
See application file for complete search history.

(56) References Cited

U.S. PATENT DOCUMENTS 4,304,494 A * 12/1981 Lutz ...................... B01F 27/052 416/224
2009/0219782 A1* 9/2009 Seiler .................... B01F 27/052 366/343

FOREIGN PATENT DOCUMENTS

| | | | |
|---|---|---|---|
| CN | 112221616 | A | 1/2021 |
| DE | 2813781 | A1 | 12/1978 |
| DE | 4432203 | A | 3/1996 |
| DE | 20307429 | U1 | 7/2003 |
| DE | 202017003318 | U1 | 8/2017 |
| EP | 0627262 | A1 | 12/1994 |

(Continued)

OTHER PUBLICATIONS

International Search Report and Written Opinion issued in PCT/EP2022/062132 and mailed Sep. 13, 2022.

*Primary Examiner* — Mohammed S. Alawadi
(74) *Attorney, Agent, or Firm* — Heslin Rothenberg Farley & Mesiti P.C.

(57) ABSTRACT

A wear element for an agitator mill includes a plate-shaped cuboid base body configured to be attached to a milling means of the agitator mill. The base body includes a front face configured to face in a direction of rotation of an agitator mill shaft. At least one end of the front face has an inclined surface area extending at an angle relative to the front face. The disclosure further relates to milling means and agitator mills incorporating the wear element, a kit including the wear element, and methods of using the same.

19 Claims, 3 Drawing Sheets

(56) References Cited

FOREIGN PATENT DOCUMENTS

| | | | | |
|---|---|---|---|---|
| EP | 3556467 | A1 * | 10/2019 | ........... B02C 17/163 |
| WO | 0007731 | A1 | 2/2000 | |
| WO | 2019201615 | A1 | 10/2019 | |

* cited by examiner

WEAR PLATES FOR AGITATOR MILLS

CROSS REFERENCE TO RELATED APPLICATIONS

This application is a U.S. National Phase filing under 35 U.S.C. § 371 of International Application No. PCT/EP2022/062132, filed May 5, 2022, and published as WO 2022/238227 A1 on Nov. 17, 2022. PCT/EP2022/062132 claims priority from European patent application No. 21173364.7, filed May 11, 2021. The entire contents of each of these prior applications are hereby incorporated herein by reference.

The present invention is directed to wear plates for agitator mills.

BACKGROUND

Agitator mills, also known as agitator ball mills, agitator bead mills or bead mills, are commonly used to grind organic and inorganic solids by a process of wet crushing with added liquids. Wet crushing is a process employed mainly in high-speed, heavy duty enclosed-type agitator mills with freely moving grinding medium. Also, these types of mills are often used as mixing devices. These mills are basically arranged in vertical or horizontal direction and are based on a grinding chamber in which the grinding takes place and in which an agitator powered by a drive motor is used to do the milling. The process stock usually flows in axial direction through the grinding chamber. The agitator or agitator shaft runs at the centre of the mill (if only one agitator is used) and transfers the power of the drive motor to the grinding medium and process stock.

Often used are grinding mediums like sand or beads made of glass, ceramic or steel, in diameters of from 0.3 to 12 mm in quantities equalling between 25 and 85% of the vessel's capacity.

In order to be able to transfer the power from the drive motor to the grinding medium and the process stock the agitator shaft usually features protrusions or extensions in the form of sticks, blade-like elements, beam-like elements, peg-like elements, square-shaped arms, discs or such, whose front sides in rotational direction basically continuously thrash at the grinding medium and the process stock.

That means that the protrusions or extensions, also called milling means, are subject to considerable wear so that the durability of the milling means is, sometimes severely, limited.

Therefore, there is a need for more durable milling means for agitator mills.

As documents relating to the field of agitator mills EP 3 536 405 A1, EP 0 627 262 A1, DE 28 13 781 A1, DE 20 2017 003 318 U1, DE 44 32 203 A1 or WO 00/07731 A1 may be mentioned.

SUMMARY OF THE INVENTION

It was an object of the present invention to improve the durability and extend the lifetime of milling means, particularly those of/in agitator mills without at the same time negatively impacting the milling process.

These and other objects, that become apparent to the person skilled in the art upon reading the following disclosure, were solved by the matter outlined in the claims, wherein dependent claims represent preferred embodiments.

In the context of the present invention, the protrusions or extensions featured on agitator shafts of mills, particularly agitator mills, having the form of sticks, blade-like elements, beam-like elements, peg-like elements, square-shaped arms, discs or such are called milling means.

In a first aspect, the present invention is drawn to plate-shaped wear elements for milling means of agitator mills, in particular plate-shaped wear element for milling means of agitator mills based on a cuboid geometry with at least one end of the front face having a first inclined surface area, wherein the front face is the face of the cuboid structure that is facing in the direction of rotation of the agitator mill shaft.

DETAILED DESCRIPTION

Figure 1:
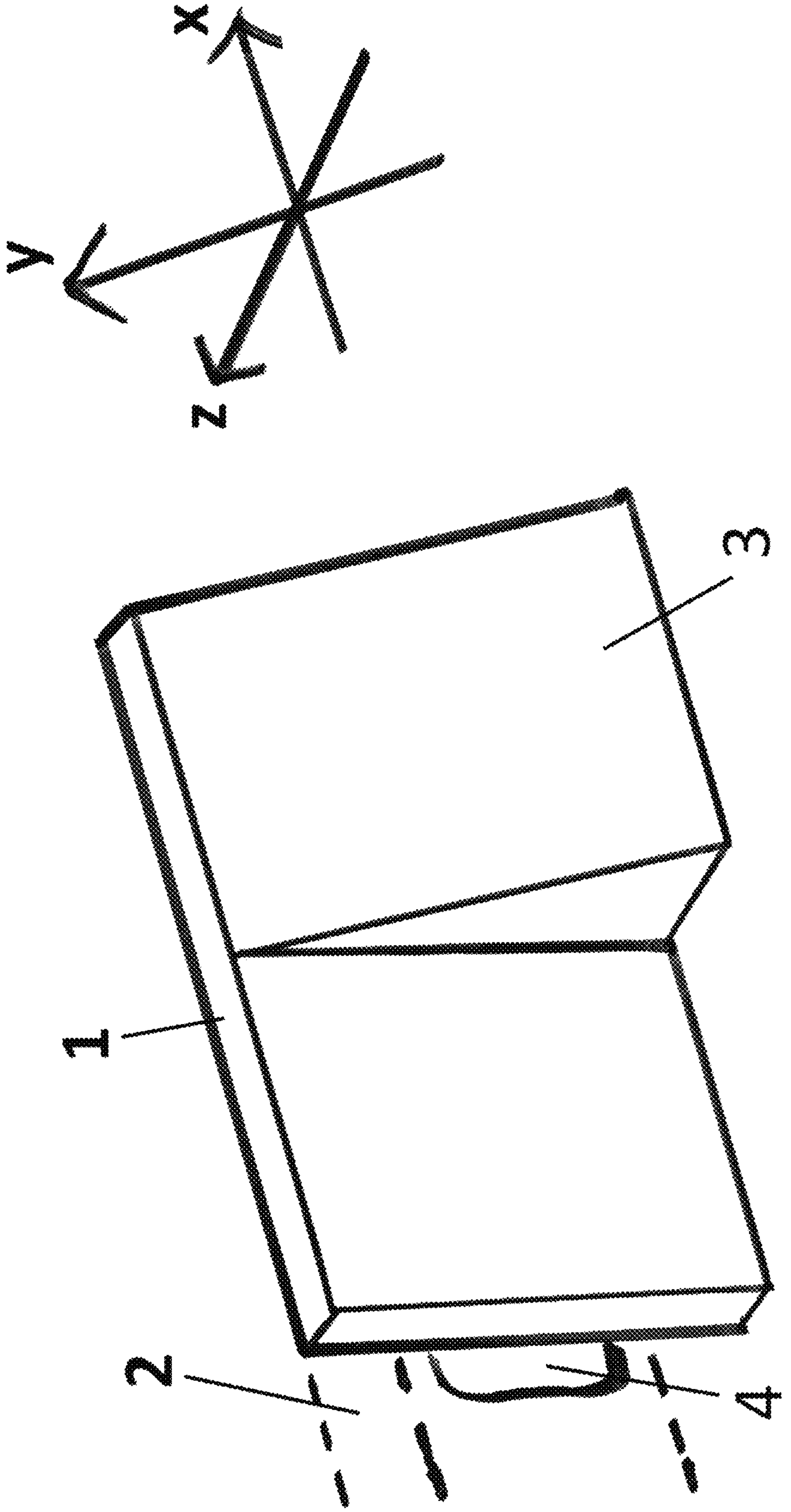
FIG. 1 shows a front perspective view of a wear element according to an aspect of the present invention.

In the context of this invention wear elements are elements that are attached to milling means of mill, particularly agitator mills, and protect the milling means as they are the parts that are subjected to the collision with the grinding medium and the process stock as a result of the rotation of the agitator shaft and the resulting wear.

The plate-shaped wear elements are based on a cuboid geometry, wherein the long faces are in the x-direction of a Cartesian coordinate system and the short faces in the y- and z-directions.

For the purposes of the invention in the Cartesian coordinate system the x-axis is the horizontal axis or abscissa, the y-axis is the vertical axis or ordinate and perpendicular to the x-axis, and the z-axis is the applicate, i.e. the axis orthogonal to the x-y-plane (the axes are pair-wise perpendicular).

According to the present invention, one of the long faces of the cuboid, that which is in front of the element with respect to the direction of rotation of the milling shaft (front face), is modified to feature at least one inclined surface area at at least one end of the face.

Therein, end of the face means the part of the face being adjacent to one face of the cuboid in the y-/z-plane (y-/z-face). Further therein, inclination means that the y-/z-face has a basically triangular geometry or a basically trapezoid geometry.

Basically triangular or basically trapezoid means that the inclined surface can be either in a straight line or in a curve, preferably in a straight line. Further, the parallel sides of the trapezoid are in the y-direction.

It will be understood by the person skilled in the art that the y-/z-face will usually have a trapezoid geometry, which is preferred according to the present invention. Sharp-edges, like in triangles, provide less stability to the work-piece than (short) sides of a trapezoid.

The inclination can be directed upwards with respect to the y-direction or downwards.

The inclination can be

- in the form of a recess with respect to the cuboid structure,
- in the form of a protrusion with respect to the cuboid structure, or
- a combination, i.e. one part of the inclined area protrudes with respect to the cuboid structure while another part is recessed with respect to the cuboid structure.

The inclination can for example be achieved and prepared/produced preferably but not exclusively a) in that a work-piece based on a prism-like geometry is attached to the end of the front face of the cuboid base structure, for example by additive manufacturing or by gluing, soldering, welding a second work-piece to the cuboid structure,
b) in that material is removed from the cuboid base structure, for example by etching
c) in that first a recess is formed in the cuboid like in b) and then to that recess a work-piece based on a prism-like geometry is attached like in a).

The angle of inclination in embodiments of the invention is between 5 and 40 degrees, preferably 10 and 30 degrees, more preferably 15 to 25 degrees, most preferably 18 to 22 degrees and especially 20 degrees, each time with respect to the y-axis in the y-/z-plane.

In certain embodiments it is possible that the basic cuboid geometry is reduced to that of a cube.

It is to be understood that the edges and peaks of the respective geometrical forms can be sharp/exact or rounded, depending on the requirements of the mixing device or the manufacturing device for the wear elements. Additionally, rounded edges and peaks are safer to handle. i.e. they mean lesser danger of hurting.

While the wear elements of the present invention can be attached to milling means such that they become integral parts, i.e. that they are not removable, it is preferred that the wear elements of the present invention are detachable/removable.

The geometry as being cuboid in the y-/z-plane refers to the wear element. The wear element can additionally comprise a structure on its back face (that face opposite the front face) with which it can be/is fastened to the milling means of an agitator mill.

It is thus within the scope of the present invention that the wear element has protrusions of the back face (that face opposite the front face) in order to facilitate fastening of the wear element (to the milling means of an agitator mill).

The wear elements of the present invention therefore preferably comprise fastening means on their back face.

In embodiments of the present invention these fastening means are i) screws, where the fastening to the milling means is done by sticking the screws through holes/apertures in the milling means and then countering the screws with nuts,
ii) screw-holes, where the fastening to the milling means is done by sticking screws through holes/apertures in the milling means and in the screw-holes and the fastening, or
iii) protrusions, preferably in the form of cuboid or a mushroom head or a dovetail or a swallowtail, where the fastening to the milling means is done by inserting the protrusion, especially from the tip-end of the milling means, via inserting and sliding the protrusions in corresponding omissions in the milling means.

In the case of protrusions, dovetail connections or swallowtail connections or mushroom head connections are particularly well suited as they offer good stability in the y-/z-plane by themselves.

In further embodiments the fastening means can be rivets, bolts or pins having barbs.

It should be noted though, that the fastening means are not limited to these means and in fact can be any fastening means known in the art.

In embodiments of the present invention the fastening means are configured to enable the wear elements to be adjusted on the milling means, particularly along the milling means parallel to the radius originating from the middle of the rotatable agitator shaft.

This adjustment can be advantageous, for example, if the tip of the wear element is worn out and becomes too short (leaving the underlying milling means unprotected).

Then it is possible to adjust and fix the wear element at the original length, thus re-protecting the milling means.

If the fastening means are punctual fastening means like screws, pins, bolts and the like it is preferred to employ a plurality, at least two, of them, because using only one may lead to undesired angling of the wear element, especially if the fastening means loosens a little upon the stress of use.

In one preferred embodiment of the present invention the wear elements have at least two screw holes as fastening elements, preferably two, three, four, or more screw holes, more particularly two screw holes or two pairs of screw holes. Into these screw holes, screws are screwed to fasten the wear elements, though it is not necessary to always use all holes.

By using screws as fastening elements, the screws extend through holes in the milling means in order to fasten the wear element. In some embodiments, the holes in the milling means are elongated (in x-direction, that is parallel to the main axis of the milling means). Such an elongated hole provides for an adjustable connection between the milling means and the wear element. By that, it is for example possible to adjust the length with which the wear elements extend beyond the outer tip of the milling means (should that be desired).

It is possible to combine any of the different fastening means.

In embodiments, the wear elements can also be glued, soldered or weld to the milling means in addition to being screwed to it.

In one preferred embodiment the fastening means are dovetail connections with additional screws, preferably two screws or two pairs of screws.

The precise area which can be inclined relative to the entire wear element is not particularly restricted.

In certain embodiments, the inclined surface area occupies between 5 and 50 percent, preferably between 15 and 35 percent, more preferably between 20 and 30 percent, of the area of the front face of the wear element.

In certain embodiments, the inclined surface area occupies a sixth of the front face of the wear element.

In certain embodiments, the inclined surface area occupies a fifth of the front face of the wear element.

In certain embodiments, the inclined surface area occupies a fourth of the front face of the wear element.

In certain embodiments, the inclined surface area occupies a third of the front face of the wear element.

In certain embodiments, the inclined surface area occupies half of the front face of the wear element.

In further embodiments the inclined surface area occupies a sixth with a deviation of +5%, a fifth with a deviation of +5%, a fourth with a deviation of +5%, a third with a deviation of +5% and a half with a deviation of +5%.

In certain embodiments, the inclined surface area can reach across the entire front face of the wear element.

In embodiments of the invention, the angle of inclination of the inclined surface area can be fixed across its entire area.

In other embodiments of the invention, the angle of inclination of the inclined surface area can vary, preferably steadily, with increasing distance from the edge. In this embodiment it is preferred that the largest angle of inclination is at the outer end.

In embodiments of the invention, the inclination of the inclined surface area is characterized by a straight line; in other embodiments the inclination is a curved line.

In preferred embodiments the first inclined surface area begins at the outer edge of the front face, at the edge to the face lying in the y-/z-plane.

In certain other embodiments the inclined surface area can be offset away from the edge.

In further embodiments the other end of the front face has a second inclined surface area, with the proviso that the upward/downward direction with respect to the y-direction is opposite that of the first inclined surface area.

The properties of the second inclined surface, apart from the upwards/downwards direction are independent from those of the first surface area and can be different or the same.

In preferred embodiments of the present invention, the second inclined surface area has the same properties as the first surface area as outlined above and the same size, but the direction of the inclination on the y-axis is opposite.

In case the wear element has two inclined surface areas on the opposite ends of the front face the respective inclined areas are restricted such that they can reach each other but do not overlap. preferably in that case the inclined surface areas each occupy between 5 and 50 percent, preferably between 15 and 35 percent, more preferably between 20 and 30 percent, or a sixth, or a fifth, or a fourth, or a third, or a half of the front face of the wear element.

In case the wear element has two inclined surface areas on the opposite ends of the front face the respective inclined areas in one embodiment have the same size and reach each other in the middle of the front face.

Accordingly, in one embodiment of the present invention the wear element has a cyclic symmetry group $C_2$, which rotational axis is perpendicular to the x-/y-plane The advantage of these wear elements having two inclined surface areas is that after the first inclined surface area has worn down, the wear element can be detached from the milling means it was attached to, then turned around and the second inclined surface area then takes the place of the first inclined surface area.

This nearly doubles the use-time of the wear elements according to the present invention.

This is possible because at the outer end of the milling means, with respect to the radius originating from the agitator shaft, the speed with which the milling means—and, accordingly, the attached wear elements—hit the grinding medium and the process stock is higher than at the inside, closer to the agitator shaft, and as such the wear is higher farther away from the shaft.

In certain embodiments of the present invention the wear elements have marking means on their back face.

By these means it is possible to press the wear elements against milling means that are not originally intended for their use and by pressing them leave markings on the milling means. Then the wear elements can be removed leaving visible markings on the milling means. These markings can then be used as drilling aids, i.e. the location where holes for the fastening means, preferably screws should be drilled into/through the milling means.

In some embodiments these marking elements are based on colour, particularly pressure sensitive colour depots that burst open upon pressure and then release the colour onto the milling means.

However, any other marking means able to leave markings on the milling means can be employed with the scope of the present invention as well. One example of further marking means would be an adhesive layer or film that loosely adheres to the back of the wear elements and upon pressure is transferred to the milling means, because it adheres stronger to that. Another example would be those based on etching media, like acid.

The marking means in one embodiment provide for elongated markings on the milling means, so that after drilling the corresponding holes, the wear plates are adjustable along the milling means.

The wear elements of the present invention can be made from a number of different materials, as long as the material is suited for application in agitator mills.

Examples for such materials that can be used for the wear elements in the context of the present invention are ceramics, plastics (polyamides, polyurethanes), hard metals or hardened metal, carbides.

Preferably the wear elements are made from iron or hardened iron or steel or hardened steel.

As already mentioned, it is possible that the inclined surface area(s) can be made of a different material than the rest of the wear element. For example, the inclined area(s) can be made of hardened iron and the rest of the wear element form non-hardened iron or the inclined area(s) can be made of hardened steel and the rest of the wear element form non-hardened steel.

The wear elements of the present invention are in principle suited for application to any milling means and any type of mill in which the milling means can be modified with the wear elements of the present invention.

The wear elements of the present invention are particularly suited for agitator mills and especially in the comminution of calcium carbonate in slurry with milling aids. For example, the milling aids in that context can be selected from the group consisting of steel beads, ceramic beads, galls beads, metal beads and mixtures thereof. In particular, these have sizes in a range of from 0.1 mm to 12 mm, preferably 0.3 mm to 4.0 mm, most preferably 0.3 mm to 3.0 mm.

In certain embodiments of the present invention the inclined surface areas are specifically hardened in order to further increase their durability.

For example, if the inclined surface areas are formed by attaching prism-like work-pieces to the cuboid base body of the wear elements, these work-pieces can be of a different material, like especially hardened steel or other materials like carbides. If such work-pieces are attached to the cuboid wear element in a removable manner, then it is possible to re-use the cuboid base of the wear element and only apply new inclined work-pieces. This way further material and costs can be saved.

One specific embodiment of the present invention relates to a detachable plate-shaped wear element for milling means of agitator mills based on a cuboid geometry with at least one end of the front face having a first inclined surface area, wherein the front face is the face of the cuboid structure that is facing in the direction of rotation of the agitator mill shaft, and

- wherein the wear element has screw holes, especially two or two pairs, as fastening elements on its back face, and
- wherein the first inclined surface area is in the form of a protrusion with respect to the cuboid structure, and
- wherein the first inclined surface is directed upwards with respect to the y-direction and the angle of inclination of the first inclined surface area is between 10 and 30 degrees, especially 20 degrees, each time with respect to the y-axis in the y-/z-plane and backwards with respect to the front face, and wherein the first inclined surface area occupies half of the front face of the wear element with a deviation of ±5%.

One further specific embodiment of the present invention is a detachable plate-shaped wear element for milling means of agitator mills based on a cuboid geometry with both ends of the front face having inclined surface areas, wherein the front face is the face of the cuboid structure that is facing in the direction of rotation of the agitator mill shaft, and wherein the wear element has screw holes, especially two or two pairs, as fastening elements on its back face, and wherein the both inclined surface areas are in the form of protrusions with respect to the cuboid structure, and wherein the first inclined surface is directed upwards with respect to the y-direction, and wherein the second inclined surface is directed downwards with respect to the y-direction, and wherein the angle of inclination of the first and second inclined surface areas is the same and between 10 and 30 degrees, especially 20 degrees, each time with respect to the y-axis in the y-/z-plane and backwards with respect to the front face, and wherein the first and second inclined surface areas are of the same size and each occupy a fourth of the front face of the wear element with a deviation of ±5% each, and wherein the wear element has a $C_2$ symmetry.

Additionally, in these two embodiments it is preferred that the material of the wear element is steel or hardened steel.

In these two embodiments additionally a cuboid- or dovetail-protrusion can be present on the back face of the wear element.

Especially preferred according to the present invention is the use of the wear plates according to the present invention for protecting milling means in agitator bead mills for milling calcium carbonate slurries with milling aids selected from the group consisting of glass beads, metal beads, especially steel beads, ceramic beads or mixtures thereof. In this context, it is preferred for the angle of inclination to be between 10 and 30 degrees, particularly 20 degrees with respect to the y-axis in the y-/z-plane and backwards with respect to the front face.

The wear elements of the present invention can have any desired size. Of course, the actual size depends on the milling means to which they should be fastened and the actual mill in which they would be employed.

In embodiments of the present invention the wear elements have a size that the milling means is entirely covered. In some embodiments at the inner end of the milling means (the rotational shaft end) a little part of the milling means remains uncovered.

In other embodiments the wear elements are bigger than the milling means and reach over and/or below (x-/y-plane) the milling means and/or beyond the tip of the milling means (in x-direction). In some preferred embodiments the wear elements reach above and below the milling means in the x-/y-plane and in x-direction beyond the tip of the milling means.

A further aspect of the present invention is a method for improving milling means without previous wear elements, particularly of agitator mills, comprising the steps of A) optionally cleaning the milling means, B) positioning and pressing wear elements according to the present invention with marking means on their back faces on the milling means to be improved or repaired, C) removing the wear elements, D) drilling holes in the milling means based on the markings obtained in step B), E) attaching the wear elements with fastening means, preferably screws or screws and nuts.

In this aspect of the present invention existing milling means, particularly of agitator means are improved in that wear elements according to the present invention are attached to milling means, which had no wear elements before. To that end it might be necessary to clean the milling means, depending on the prior use. The wear elements of the present invention in this context have marking means on their back and are then positioned and pressing against the milling means. Due to the pressure applied the marking means on the back faces of the wear elements leave marks on the milling means. The wear elements are then removed and the markings on the milling means can be used as drilling stencils. Then holes can be drilled in the milling means based on the markings. After the holes are drilled, the wear elements are again attached to the milling means and are then fastened to the milling means.

It is to be understood that the marking means and fastening means in this context are the same as described above. Preferably, the marking means are colour based and/or adhesive film based and the fastening means are screws or screws and nuts, especially screws.

The marking means in this context can be provided either separate or be pre-applied to the back faces of the wear elements. If they are provided separately, they are applied to the wear elements before step B).

A further aspect of the present invention is a method for repairing milling means, particularly of agitator mills, comprising the steps of I) removing worn out wear elements II) optionally cleaning the milling means, III) positioning wear elements according to the present invention on the milling means to be repaired, IVa) if there are existing drill holes or screw holes that can be used to fasten the wear elements, fastening the wear elements with screws or screws and nuts, especially screws, or IVb) if there are no existing holes that can be used, pressing wear elements according to the present invention with marking means on their back faces on the milling means to be repaired, IVb1) removing the wear elements, IVb2) drilling holes in the milling means based on the markings obtained in step IVb), IVb3) attaching the wear elements with fastening means, preferably screws or screws and nuts, especially screws.

In this context, the worn out wear elements that are to be replaced do not have to be those according to the present invention but can be any kind of wear elements that were previously attached to the milling means. It might be advantageous though, if it were wear elements according to the present invention in that then the possibility of being able to re-use existing screw holes is greater.

With respect to the respective features, reference is made to the description above. The marking means, also in this context, can be provided either separate or be pre-applied to the back faces of the wear elements. If they are provided separately, they are applied to the wear elements before step IVb).

A still further aspect of the present invention are kits for improving or repairing milling means, particularly of agitator mills, comprising wear elements of the present invention, particularly a selection of them in different sizes, marking means, either separate or pre-installed on the back face of the wear elements, fastening means, preferably screws, or screws and nuts, optionally installation guide.

These kits are kits of parts, the parts of which are described above.

These kits comprise all the parts needed to perform the two methods of the present invention as described above; the kits are not limited to these methods, however.

Ideally the kits comprise a certain number of different wear elements in different sizes, so that different types and sizes of mills can be serviced. In this context it is beneficial, if of any give size and type of wear element several copies are present, so that more than one milling means of a given mill can be serviced at the same time.

The marking means in this context can be those described above. In the context of these kits the marking means can be either separate or pre-applied/pre-installed to the back faces of the wear elements.

In the context of these kits it is beneficial and thus preferred in some embodiments if all the various wear elements have the same fastening means.

In the context of the kits it is preferred if the fastening means are selected from screws and or screws, preferably all with the same diameter and the same thread.

Protrusions on the back side are possible but generally not preferred in the context of these kits, because without them the wear elements are generally more flexible in to which milling means they can be attached.

While it is believed that the person skilled in the art being provided with a kit according to the present invention should be able to derive their function and how to use them from the content of the kit and his general knowledge, it is possible to add an installation guide. This may sometimes be beneficial, if additional information is given in it, for example what the material of the respective wear elements is, what their expected lifetime is under given circumstances and so on.

It is further possible that the kits additionally comprise spare screws, spare bolts and such.

Also, the kits can comprise means for maintenance operations like cleaning means or such.

These kits are particularly suited for use in the methods of the present invention for improving or repairing milling means.

Another aspect of the present invention is an agitator mill comprising a milling means and a wear element according to present invention attached to the milling means.

It was surprisingly found in the context of the present invention that the wear elements of the present invention are able to significantly protect milling means, particularly of agitator means while at the same time not negatively impacting the milling process. Quite the contrary, with the inclined surface areas the process can even be improved. It was unexpectedly found that the inclined surface areas help to support the vertical recirculation of the slurry and bead mixture over the entire length of the mill. With simple flat plates it can happen that local recirculation just around each milling means occurs but not enough recirculation over the entire mill length. The improvement of the present invention in this context is of high value, because more and more mills tend to be increased in length (height) of the mill. Without sufficient vertical recirculation in the bottom of the mill overgrind occurs and worse product quality and too high viscosity which can lead to clogging the outlet screens is the result. When using the wear elements of the present invention this disadvantage can surprisingly be overcome.

The matter of the respective embodiments of the present invention, like those of the claims, but not restricted to those, can be combined in any desired manner, as long as the combination makes technical sense.

The various embodiments, including the preferred embodiments described in the context of the wear elements themselves are applicable to the kit and the method as well.

The present invention is further illustrated by the accompanying figures. The figures are not to be construed as limiting. The figures are illustrative only, are not to scale and reduced to the elements necessary for illustration. In the figures, same numerals denote same features.

FIG. 1 shows a view to the front of a wear element according to the present invention 1, which is attached to a milling means 2 (represented by dotted lines in this figure). The millings means 2 extends substantially in a longitudinal direction which defines the x-direction. The wear element 1 shown in this embodiment has one inclined surface area 3. In the shown embodiment the inclined area protrudes from the cuboid base body of the wear element. Also shown is a part of a recess 4 in the milling means, which recess 4 in the shown embodiment helps to attach the wear element. It further illustrates the possibility to adjust the position of the wear element 1 on the milling means 2 in the horizontal direction (x-direction) such that there is some room left for the wear element 1 to be slid in. For orientation the directions of a Cartesian coordinate system are given in the upper right corner of the figure.

Figure 2:
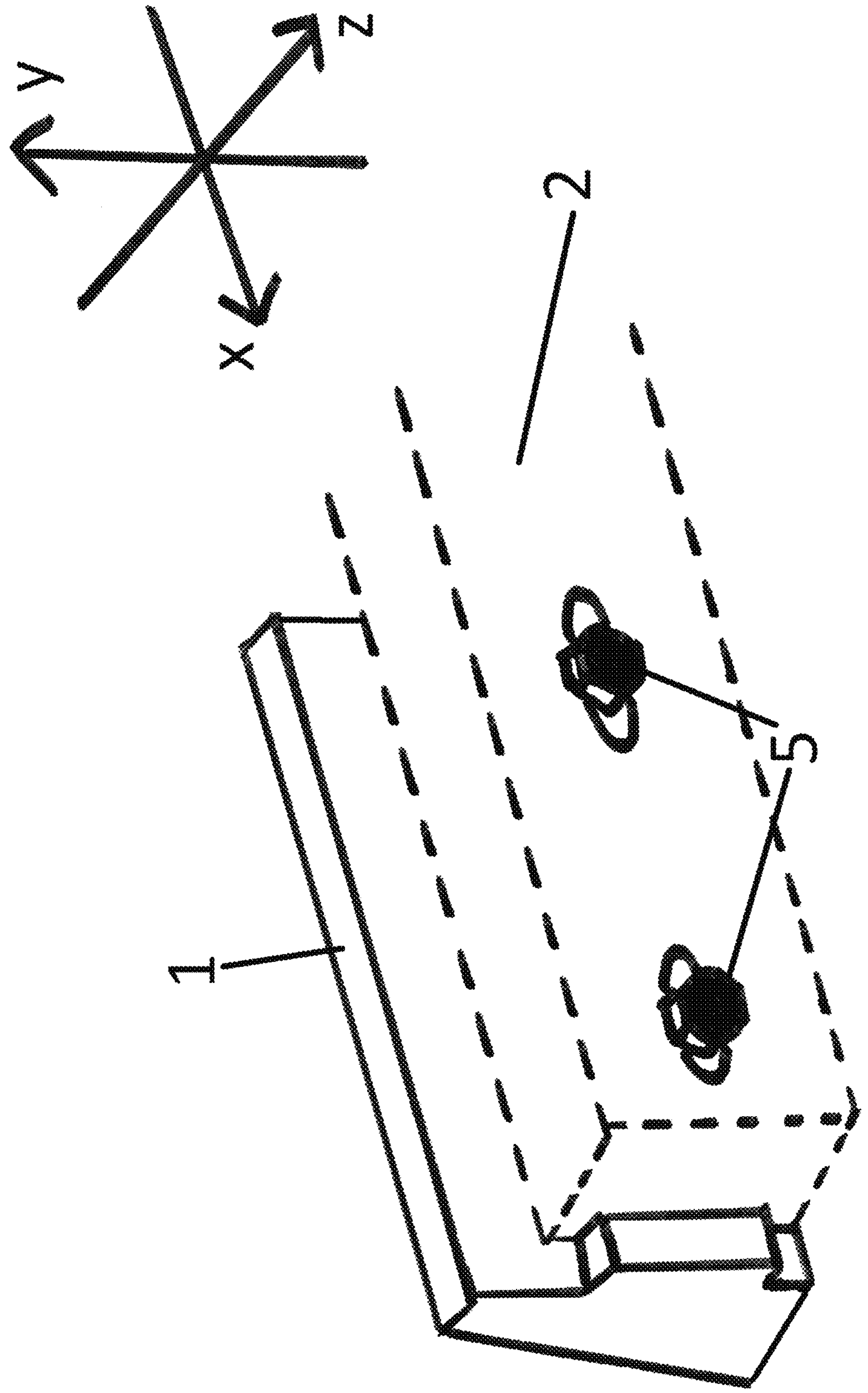
FIG. 2 shows a back perspective view of the wear element of FIG. 1 according to an aspect of the present invention.

FIG. 2 shows the same configuration as FIG. 1, but from the back. It can be seen here that screws 5 are used as fastening means in the shown embodiment. In the embodiment shown here, the screws are screwed to the wear element 1 through elongated screw holes that allow for adaptation of the position in x-direction. Also it can be seen that on the left side the wear element 1 protrudes a little with respect to the milling means 2 (represented by dotted lines in this figure). This illustrates the possibility to adjust complementary to FIG. 1. For orientation the directions of a Cartesian coordinate system are given in the upper right corner of the figure, wherein the directions are the same as in FIG. 1.

Figure 3:
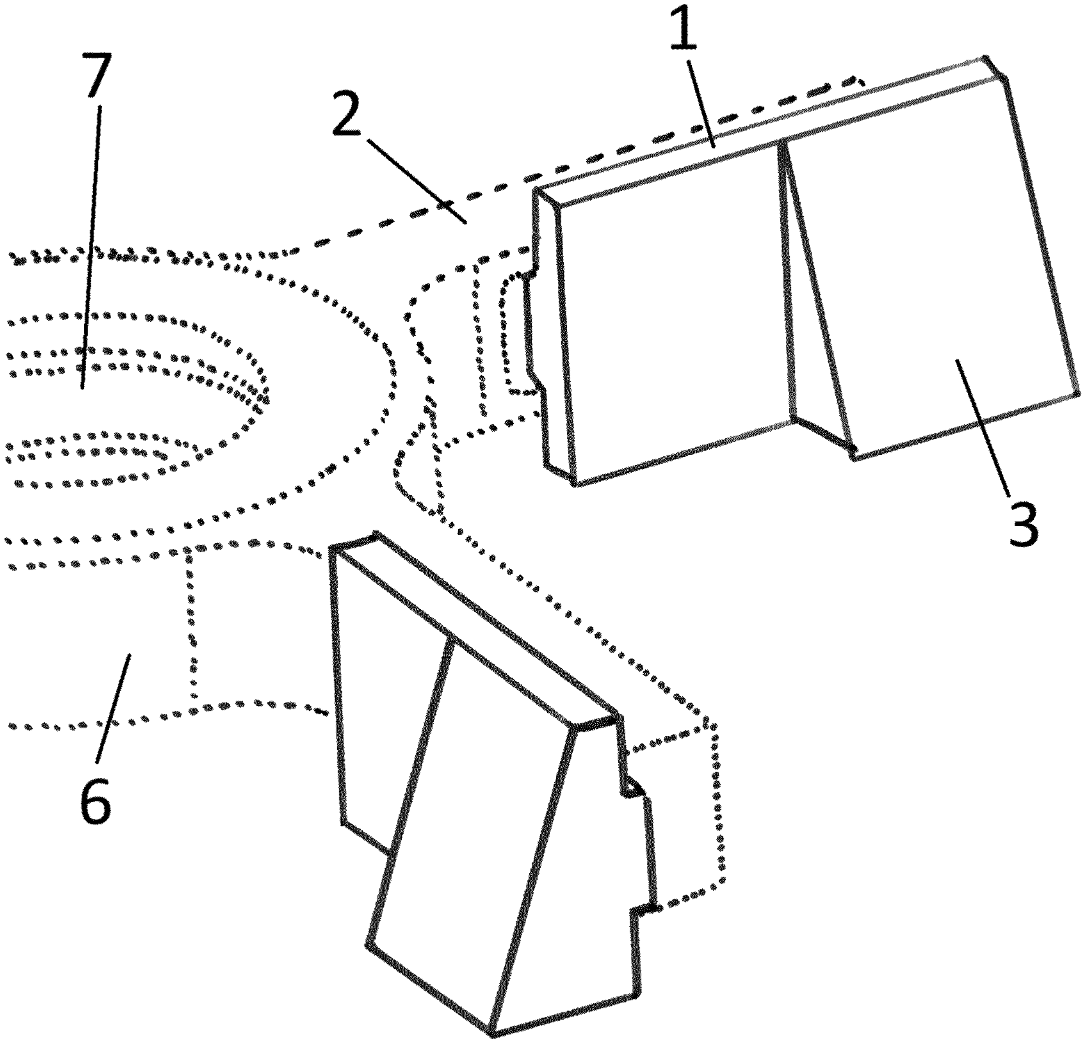
FIG. 3 shows a perspective view of the wear element of FIG. 1 attached to an arm-like milling means of a circular element according to an aspect of the present invention.

FIG. 3 shows a part of a circular element 6 which can be attached to an agitator shaft (not shown) which would go through the hole 7 in the middle of the circular element. The circular element 6 shown in this embodiment comprises arm-like milling means 2 (of which two are shown in the figure) each with attached wear elements 1. The direction of rotation of the agitator shaft defines the y-direction.

LIST OF NUMERALS GIVEN IN THE FIGURES

1 wear element according to the present invention
2 milling means
3 inclined surface area
4 recess
screws
6 circular element comprising milling means with attached wear elements
7 hole for agitator shaft

The invention claimed is:

1. A wear element for an agitator mill comprising a plate-shaped, cuboid base body, wherein the wear element is attached to a milling means of the agitator mill, and wherein the cuboid base body comprises long faces and short faces, with the long faces of the cuboid base body in the x-direction of a Cartesian coordinate system and the short faces of the cuboid base body in the y- and z-directions of the Cartesian coordinate system, wherein the cuboid base body has a front long face configured to face in a direction of rotation of an agitator mill shaft of the agitator mill with at least one end of the front long face further configured to have a first inclined surface area, wherein the first inclined surface area has an angle of inclination and is configured as a protrusion with respect to the cuboid base body, or a protrusion in combination with a recess with respect to the cuboid base body; and wherein the first inclined surface area extends continuously between an upper outer edge and a lower outer edge of the front long face such that the first inclined surface area extends substantially the entire distance between the upper outer edge and the lower outer edge.

2. The wear element according to claim 1, wherein the wear element is detachable.

3. The wear element according to claim 1, wherein the wear element has fastening means on a back long face of the wear element.

4. The wear element according to claim 3 wherein the fastening means are selected from the group consisting of screws, screw-holes and protrusions.

5. The wear element according to claim 4 wherein the fastening means are two screw-holes or two pairs of screw-holes.

6. The wear element according to claim 1, wherein the angle of inclination of the first inclined surface area is directed upwards or downwards with respect to the y-direction of the wear element.

7. The wear element according to claim 1, wherein the angle of inclination of the first inclined surface area is between 5 and 40 degrees with respect to the y-axis in the y-/z-plane of the wear element and backwards with respect to the front long face.

8. The wear element according to claim 7, wherein the angle of inclination of the first inclined surface area is between 18 to 22 degrees with respect to the y-axis in the y-/z-plane of the wear element and backwards with respect to the front face.

9. The wear element according to claim 1, wherein the first inclined surface area occupies between 5 and 50 percent of the front long face of the wear element.

10. The wear element according to claim 9, wherein the first inclined surface area occupies between 20 and 30 percent of the front long face of the wear element.

11. The wear element according to claim 9, wherein the first inclined surface area occupies between 15 and 35 percent of the front long face of the wear element.

12. The wear element according to claim 9, wherein the first inclined surface area occupies a sixth of the front long face of the wear element.

13. The wear element according to claim 1, wherein the front long face has a second inclined surface area with a second angle of inclination, wherein the second angle of inclination of the second inclined surface area is directed upwards or downwards with respect to the y-direction of the wear element in a direction opposite that of the first inclined surface area.

14. The wear element according to claim 1, wherein the wear element has marking means on a back long face of the wear element.

15. A method of using the wear element according to claim 1 said method comprising a step of fastening the wear element to the milling means of the agitator mill, introducing a calcium carbonate slurry with milling aids to the agitator mill, and milling the calcium carbonate slurries, said milling aids selected from the group consisting of glass beads, metal beads, steel beads, ceramic beads and mixtures thereof.

16. A method for improving the milling means of claim 1 comprising steps of A) positioning and pressing the wear elements according to claim 1 with marking means on back faces of the milling means to be improved, B) removing the wear elements, C) drilling holes in the milling means based on the markings means obtained in step A), and D) attaching the wear elements with fastening means.

17. A method for repairing the milling means of claim 1 comprising steps of I) removing worn out wear elements II) positioning the wear elements according to claim 1 on the milling means to be repaired, III) fastening the wear elements with screws or screws and nuts, or IIIb) pressing the wear elements according to claim 1 with marking means on back faces of the milling means to be repaired, IIIb1) removing the wear elements, III) drilling holes in the milling means based on the markings obtained in step IIIb), and IIIb3) attaching the wear elements with fastening means.

18. A kit for improving or repairing the milling means of claim 1 comprising the wear elements according to claim 1, marking means, either separate or pre-installed on a back face of the wear elements, and fastening means.

19. An agitator mill comprising the milling means and the wear element according to claim 1 attached to the milling means.

* * * * *